March 10, 1936.   C. F. CHAPMAN   2,033,413
EMULSIFYING METHOD
Original Filed April 23, 1932   3 Sheets-Sheet 1

Inventor
Charles F. Chapman
By Fisher, Clapp, Soans & Pond   Attys.

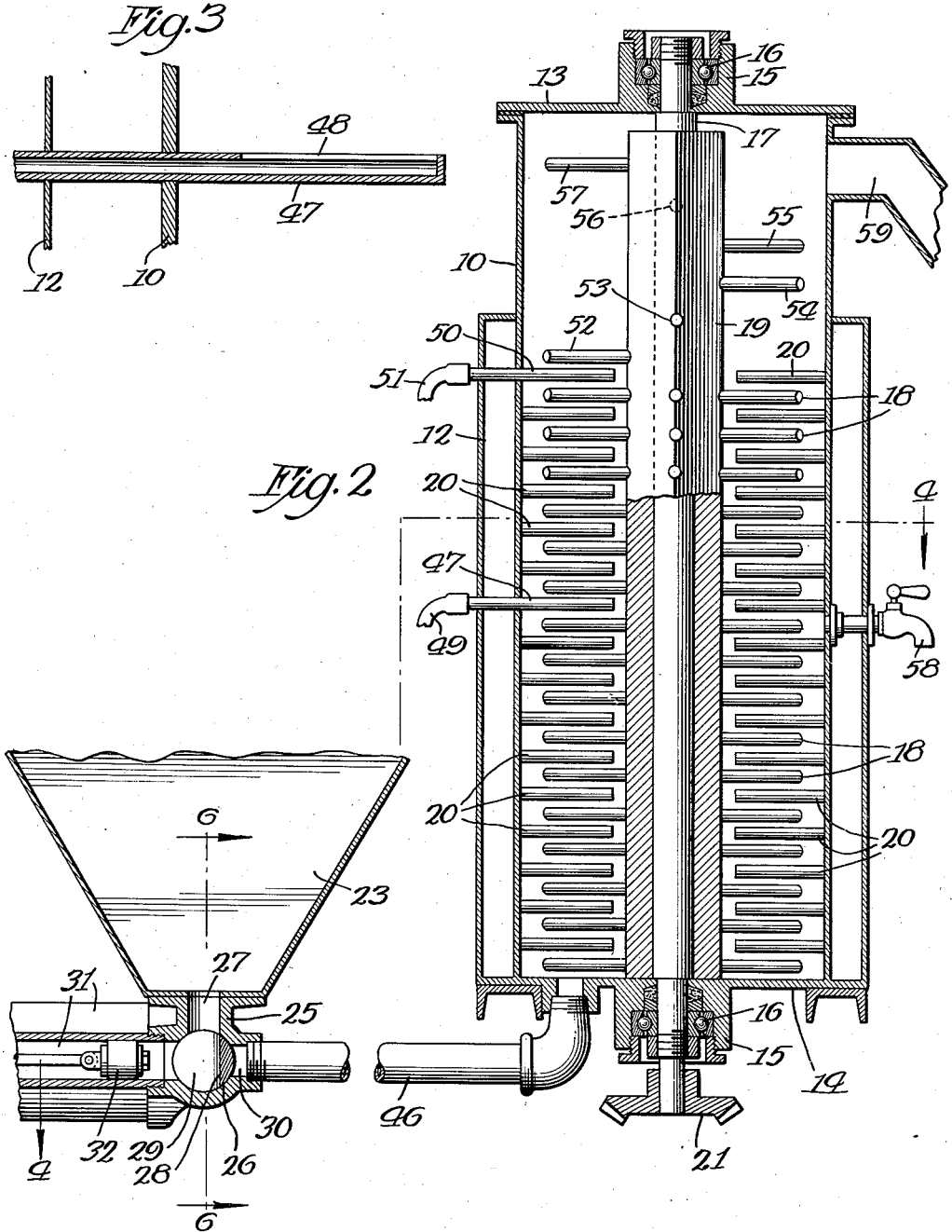

March 10, 1936.      C. F. CHAPMAN      2,033,413
EMULSIFYING METHOD
Original Filed April 23, 1932    3 Sheets-Sheet 3
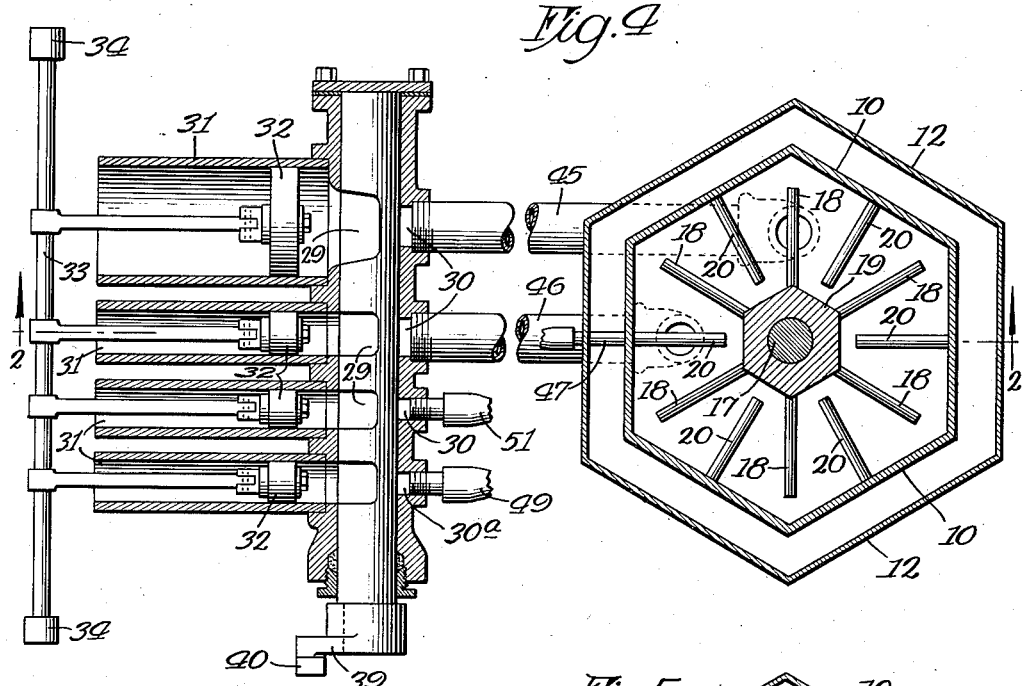
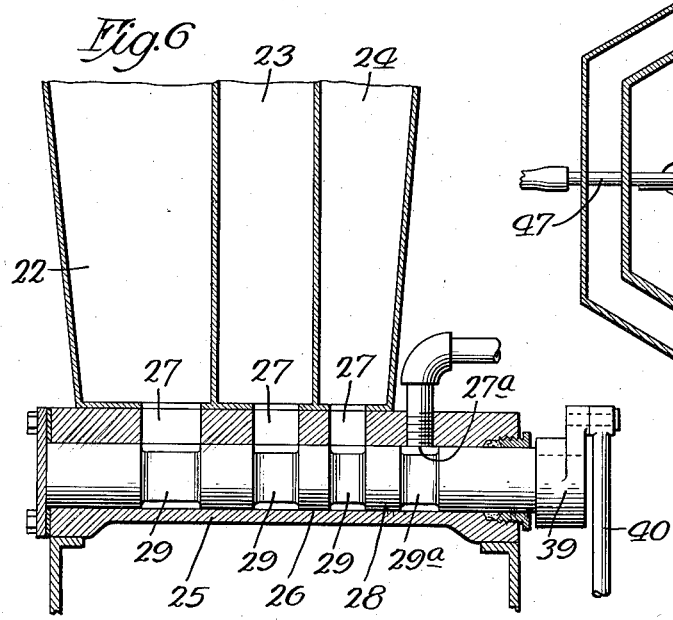
Inventor
Charles F. Chapman
By Fisher, Clapp, Soans & Pond.   Attys.

Patented Mar. 10, 1936

2,033,413

UNITED STATES PATENT OFFICE 2,033,413

EMULSIFYING METHOD

Charles F. Chapman, Chicago, Ill., assignor to Kraft-Phenix Cheese Corporation, Chicago, Ill., a corporation of Delaware Original application April 23, 1932, Serial No. 607,035. Divided and this application February 21, 1933, Serial No. 657,818

1 Claim. (Cl. 99—11)

This application is a division of my pending application Serial No. 607,035, filed April 23, 1932, and the invention involved herein relates to an improved emulsifying method which is susceptible to use in the production of many varied kinds of emulsified products, although designed particularly for the purpose of making salad dressing, particularly the kind ordinarily known as mayonnaise.

The objects of the invention are to provide a continuous process for making an emulsified product; to provide a process or method of making an emulsified product which will produce a product of uniform desired consistency; to provide a method such as referred to which will speed up the production of the emulsified product; and in general, it is the object of the invention to provide an improved method or process for making an emulsified product.

Other objects and advantages of the invention will be understood by reference to the following specification and accompanying drawings (3 sheets) in which apparatus is illustrated for carrying out the improved method in making mayonnaise.

In the drawings:—

Fig. 2 is a central vertical section through the apparatus, the plane of this section being indicated by the line 2—2 of Fig. 4;

Fig. 3 is a detail section;

Fig. 4 is a plan section on the line 4—4 of Figs. 1 and 2;

Fig. 5 is a plan section corresponding to a portion of Fig. 4, but showing a changed position of a rotary element; and Fig. 6 is a section on the line 6—6 of Fig. 2.

Figure 1:
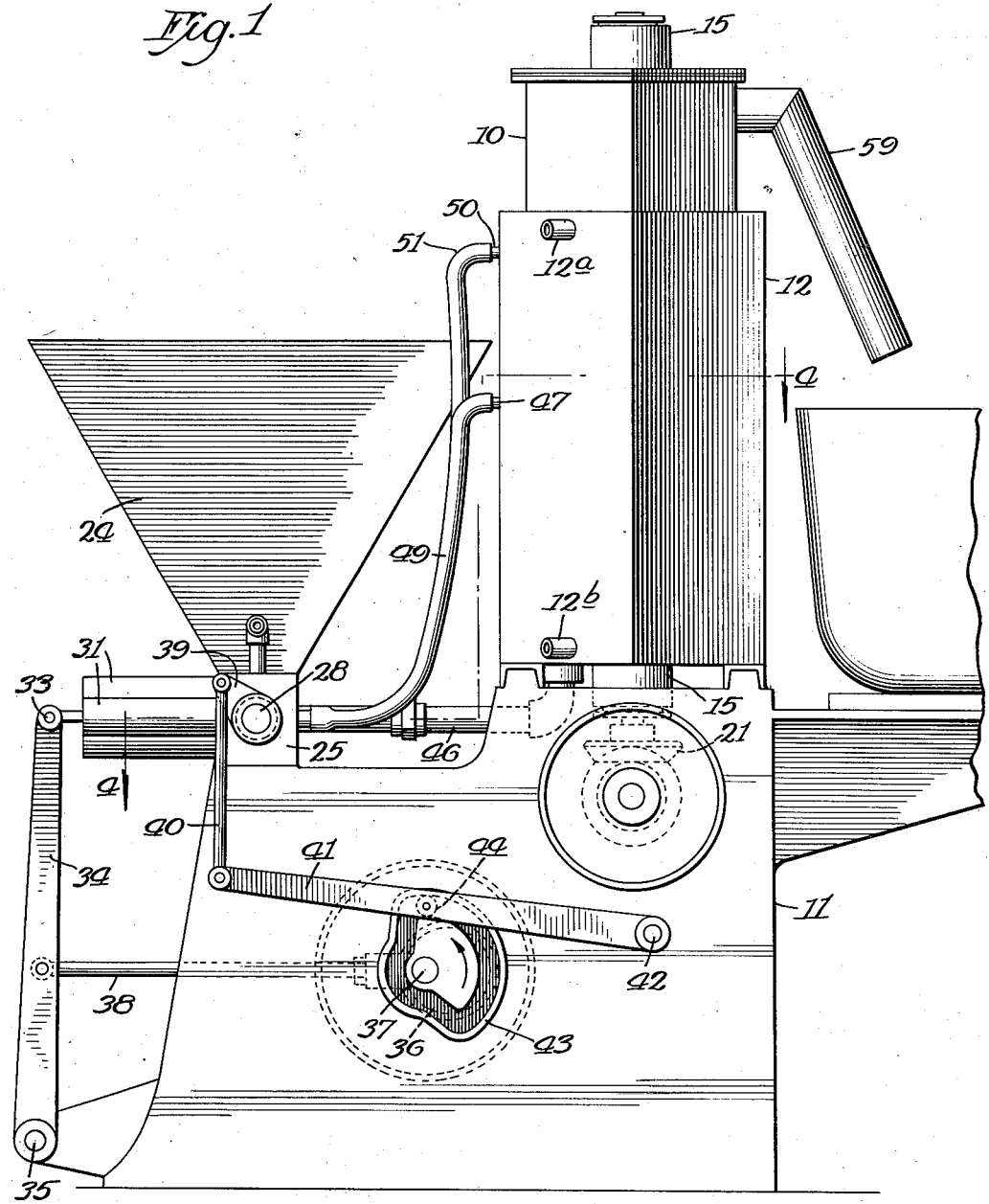
Fig. 1 is a side elevation.

Referring now to the drawings, the apparatus therein disclosed includes an upright or vertical tank or receptacle 10 which is suitably supported on a base or frame 11 and surrounded for the major portion of its length by a water jacket 12 whereby the temperature of the material within the receptacle 10 may be controlled.

Inlet and outlet connections 12ª and 12ᵇ respectively afford communication with the jacket 12 whereby warm or cool water or other fluid may be circulated in the jacket.

The receptacle 10 is preferably a multi-sided receptacle, in this instance 6-sided or hexagonal in plan as clearly shown in Figs. 4 and 5. The use of a multi-sided receptacle such as just mentioned offers considerable advantage over a plain round receptacle by reason of a sort of kneading or rolling effect produced in the material emulsified which is emphasized probably because of the sweeping action of an agitator element, presently to be described, past the corner pockets of the receptacle.

The receptacle is provided with top and bottom closures 13 and 14 respectively which are suitably secured to the receptacle, and the said end closures are provided with suitable bosses such as indicated at 15 for housing anti-friction bearing 16 in which the shaft 17 of an agitator is rotatably mounted at its opposite ends.

The agitator includes, in this instance, a plurality of vertically spaced sets or series of beater pins 18. Each set or series of beater pins 18 consists of a plurality of beater pins, in this instance 6, which extend radially outwardly from the shaft 17, the said pins being mounted on the shaft in this instance through the agency of a wood sleeve or collar 19 which is secured to the shaft for rotation therewith in any suitable manner.

A plurality of sets or series of normally stationary beater pins 20 extend inwardly from the sides of the receptacle, these sets being also arranged in vertically spaced relation intermediate the sets or series of rotatable beater pins 18. As will be understood from an inspection of Figs. 2 and 4, each layer or set of beater pins 20 consists of a plurality of such pins, in this instance 6, which extend radially inwardly from the respective side walls of the receptacle.

The agitator may be rotated by any suitable power means which may have an operative connection with the shaft 17 through the agency of a bevel gear 21 on the lower end of the said shaft.

Commercial mayonnaise is ordinarily made of oil, egg, vinegar and air. For introducing such ingredients into the receptacle in proper proportions, the following described supply and measuring apparatus may be associated with the emulsifying apparatus proper. Hoppers 22, 23, and 24 for holding supplies of oil, egg, and vinegar respectively, are provided. These hoppers are preferably made as a single unit as indicated in Fig. 6, and has secured to its lower end a multiple valve member 25. This valve element includes a cylindrical chamber 26 which has openings such as indicated at 27 for communicating with the respective supply hoppers. A valve core 28 is rotatably mounted in the cylinder 26 and is provided with cut-out portions such as indicated at 29 which register with the openings 27 and with corresponding discharge openings such as 30. Another opening or cut-out 29ª in the valve core registers with an inlet opening 27ᵃ which has a suitable connection to a source of clean air. The last mentioned valve opening 29ᵃ also registers with an outlet opening 30ᵃ in the valve body 25. The respective valve core passageways 29 and 29ᵃ also communicate through suitable openings in the valve body 25 with measuring cylinders 31 within which are disposed suitable pump pistons 32.

The pump pistons 32 are connected by means of suitable connecting rods or links to a bar 33 which is carried in the upper ends of a pair of rock arms 34. The rock arms 34 are connected together for unitary rocking movement about a pivot 35 on the main frame 11. The arms 34 are adapted to be rocked by means of an eccentric 36 on a suitably driven shaft 37, the rock lever and eccentric being connected by means of a connecting rod 38.

The valve core is adapted to be rocked through the agency of a lever 39 which is connected to one end of the valve core as clearly shown in Figs. 4 and 6, a link 40 which extends between the free end of the lever 39, and the free end of another lever 41 which is pivoted as indicated at 42 on the main frame 11, and a cam 43 which is carried by the shaft 37 and operatively connected to the arm or lever 41 through the agency of a cam collar 44 which is mounted on the said arm 41.

By inspection of Fig. 2, it will be seen that when the valve core is in the position there illustrated and the pump pistons 32 move outwardly in the respective cylinders, the respective cylinders will be filled with material drawn from the respective hoppers. When the pump piston 32 is in its outermost position, the valve core 28 is turned by the described mechanism so as to close the openings 27 between the hoppers and the measuring pumps and to establish communication between the measuring pumps and outlets 30 and 30ᵃ. Then when the pistons are reciprocated inwardly, the quantity of material in front of the piston is forced into the emulsifying receptacle, suitable conduits being provided for conveying the respective ingredients from the measuring pump to the receptacle.

In this instance, the main or basic ingredients of the emulsified product (egg and oil) are carried by conduits 45 and 46 to suitable inlet openings in the bottom of the receptacle as clearly shown in Fig. 2. The air from one of the measuring pumps is preferably injected into the interior of the receptacle at a point spaced materially upwardly from the bottom thereof, an air inlet 47 being herein shown located slightly above the middle of the zone of operation of the emulsifying beater pins 18 and 20. As shown, the air inlet 47 is in the form of a pipe having outlet perforations in its side wall, to more or less spray air into the emulsified content of the receptacle. The inlet pipe 47 is of a size comparable with one of the stationary beater pins 20 and is substituted therefor. The air outlet element 47 is connected by means of a suitable conduit 49 with the air pump.

In the production of mayonnaise, an ingredient such as vinegar may be added but it is desirable to add such ingredient near the end of the emulsifying process if not actually after the completion of the emulsifying operation. Accordingly, an inlet member 50 for a final ingredient such as vinegar is provided in lieu of one of the normally stationary beater pins 20 of the top set, as clearly shown in Fig. 2. The inlet member 50 is preferably in the form of a tube having a closed end and an outlet slot 48 through which the ingredient is discharged into the emulsified content of the receptacle. As indicated in the drawings, the inlet 50 is connected by a conduit 51 with its proper measuring pump.

As above indicated, it is not desired to continue to any material extent an emulsifying agitation or beating of the product after an ingredient such as vinegar is added. However, it is important to effect uniform distribution of such ingredient in the emulsified product, and for this purpose, a series of beater or mixing pins 52, 53, 54, 55, 56, and 57 are provided on the upper end of the rotating sleeve 19. As will be understood from an inspection of Fig. 2, this series of mixing pins is arranged in a spiral fashion about the sleeve 19. There are no stationary beater pins such as 20 in the upper or mixing zone of the receptacle 10; and hence, the mixing pins just mentioned have only a gentle stirring-in action on the last injected ingredient instead of an emulsifying effect.

It will now be understood that the basic ingredients of the emulsified product to be made are introduced into the bottom of the receptacle, and that these ingredients are gradually and thoroughly emulsified as they progress upwardly as an incident to the introduction of successive qualities of such ingredients. It is preferable that the arrangement be such that a fairly complete emulsification be accomplished before the product reaches the air inlet 47. The beater pins 18 and 20 disposed about the air inlet 47 then serve to effectively distribute the air uniformly throughout the material in the receptacle within the zone of action of the beater pins above the said air inlet. Of course, the beater pins in this upper zone of action serve to improve the emulsification, while also beating in the air as described. For testing the quality of the emulsification at about the level of the air inlet 47, a tap 58 may be provided for facilitating the drawing off of a sample of the emulsification.

An outlet spout 59 is provided at the upper end of the receptacle and it will be apparent that in view of the successive introduction of quantities of the material emulsified, there will be a constant flow of the emulsified product out of the upper end of the receptacle. Hence, the apparatus described serves to carry on a continuous process of emulsification. It will be apparent that the emulsifying effect obtained in the above described apparatus may be controlled by varying the number and spacing of the rotary and stationary beater pins; for example, the emulsifying effect of the rotary agitator is almost entirely eliminated in the upper portion of the receptacle where the last series of rotary beater pins 52 to 57 inclusive serve only to effect a gentle mixing of the last added ingredient to the emulsified product. Hence, it may be said that the described apparatus is adjustable to control the degree of emulsification effected.

Changes in the described structure and adaptations thereof to the production of various emulsifications may be made without departing from the spirit of the invention, the scope of which should be determined by reference to the following claim, the same being construed as broadly as possible consistent with the state of the art.

I claim as my invention:—

The continuous process of making an edible emulsified product such as mayonnaise which consists in injecting measured quantities of the basic ingredients of the product into a receptacle, subjecting such ingredients in the receptacle simultaneously to beating and kneading action to effect emulsification thereof, successively and periodically injecting additional measured quantities of said ingredients, thereby to cause the ingredients in the receptacle to advance therein step-by-step and to be subjected at successive stages in the receptacle to emulsifying action, introducing a predetermined quantity of suitable gas into the ingredients in the receptacle and effecting distribution thereof throughout said ingredients as an incident to said emulsifying action and, at a point adjacent an outlet in the receptacle for the emulsified product, injecting a predetermined amount of vinegar or the like and gently stirring the latter into the product.

CHARLES F. CHAPMAN.